March 8, 1938. O. MYLIUS 2,110,527
SUSPENSION FOR VEHICLES
Original Filed Nov. 26, 1935
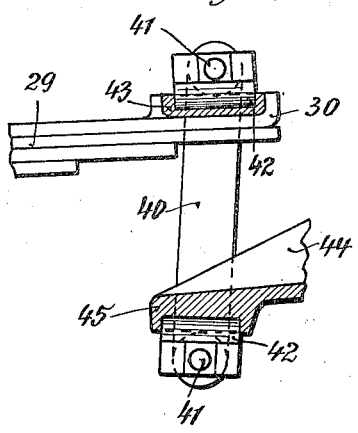
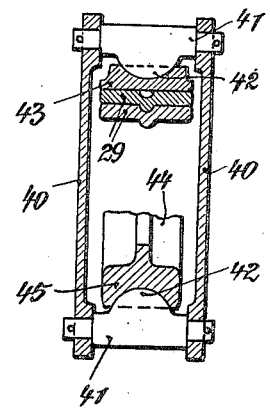
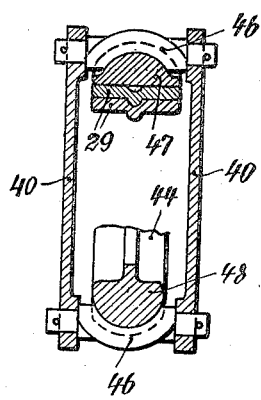
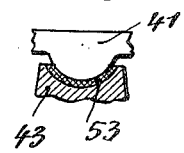

Patented Mar. 8, 1938

2,110,527

UNITED STATES PATENT OFFICE 2,110,527

SUSPENSION FOR VEHICLES

Otto Mylius, Berlin, Germany, assignor to Deutsche Getriebe Gesellschaft mit beschränkter Haftung, Berlin, Germany Original application November 26, 1935, Serial No. 51,683. Divided and this application September 1, 1936, Serial No. 98,980. In Germany April 27, 1934

5 Claims. (Cl. 267—54)

The present invention relates to a suspension for vehicles, in particular rail vehicles and is a division of my copending application Serial Number 51,683, filed November 26, 1935.

The object of the present invention is to arrange the suspension in such a manner that an increased friction is generated between the parts of the suspension while the suspension is in use, whereby the oscillations of the vehicle are damped.

The object of the present invention is especially to damp those oscillations of the vehicle which are directed transversely to the longitudinal axis of the track. These transverse oscillations are very unpleasant for the passengers and dangerous because they may lead to derailment.

It is already known to make use of friction for damping these oscillations. Previously however only the friction in the plate springs when they bend has been made use of, or additional damping means such as shock absorbers have been connected with the springs. Thus special arrangements were made use of previously which were additional to the ordinary parts of the suspension of the vehicle, were therefore expensive and increased the weight.

The present invention obviates additional parts. It makes use rather of the normal suspension means namely the shackles each having two universal joints, one joint of which is connected to a supporting spring and the other joint to a support on the vehicle frame. Each universal joint has two cylindrical plain or journal bearings, the axis of one plain or journal bearing being directed substantially parallel to the longitudinal axis of the vehicle and the axis of the other journal bearing being directed horizontally and vertically to the longitudinal axis of the vehicle.

The present invention is characterized in that the diameter of that cylindrical plain or journal bearing, whose axis is substantially parallel to the longitudinal axis of the vehicle, is greater than the diameter of the other cylindrical plain or journal bearing whose axis is directed horizontally and vertically to the longitudinal axis of the vehicle.

The particular constructional forms of the remaining features of the present invention will be clear from the following description and from the claims.

The invention is illustrated by a number of examples in the accompanying drawing, in which:—

Figs. 1 and 2 are longitudinal and transverse sections through a suspension according to the invention.

Fig. 3 is a transverse section through another constructional form.

Fig. 4 is a transverse section of part of the shackle provided with material adapted to increase the friction.

The examples of the invention according to Figs. 1 to 4 are characterized by the feature that the universal joints of the shackles are made to operate with a high degree of friction. To this purpose, the joints are in the form of plain or journal bearings and the cylinders or cones, the surfaces of which slide over one another, are of large diameter.

In the construction indicated in Figs. 1 and 2, the shackles are composed of two side plates 40. In both ends of a pair of side plates 40, bolts 41 are rotatably inserted, the axes of said bolts lying substantially in a horizontal plane and directed at right angles to the longitudinal axis of the vehicle. The drilled holes in the side plates 40 and the heads of the bolts 41 form a cylindrical plain or journal bearing, whose axis is horizontal and at right angles to the longitudinal axis of the vehicle.

The bolts 41 have in their center a half-cylindrical thickening 42, whose axis is directed substantially parallel to the longitudinal axis of the vehicle. The leaf spring 29 has at its upper end a fork-like seat 30, in which a removable pan 43 is inserted in such manner that it cannot shift. The upper surface of the socket 43 forms a hollow cylinder of the same diameter as the half-cylindrical thickening 42 of the bolt 41. This thickening 42 rests in the socket 43, and these two elements form a cylindrical plain or journal bearing, whose axis is directed substantially parallel to the longitudinal axis of the vehicle. As Fig. 1 shows, the socket 43 has two end flanges in the direction of the longitudinal axis of the vehicle, which flanges prevent a shifting of the bolts 41 in the longitudinal direction of the vehicle. A transverse shifting is prevented by the shackle's side plate 40.

The two bearings mentioned, consisting of the elements 40, 41, and 42, 43, respectively, together form a universal joint which serves to connect the end of the spring 29 with the upper end of the shackle 40.

The lower end of the shackle 40 is connected in the same manner with the support 44, which is attached to the frame of the vehicle. Bolt 41 has, again, the half-cylindrical thickening 42 in its center, and the support 44 has a device 45, constituting the hollow cylindrical socket, on its lower end. The thickening 42 rests in the socket 45 and is protected from lengthwise shifting by the end flanges.

According to the invention, the diameter of the half-cylindrical thickenings 42 is greater than the diameter of the ends of the bolts 41, as shown in Figs. 1 and 2. Consequently, due to the great friction, the universal joints damp especially those vibrations of the moving vehicle which are directed cross-wise to the longitudinal axis of the vehicle and rails. These, however, are the particularly more unpleasant and dangerous vibrations, while those in the longitudinal axis of the vehicle are not so disturbing.

The construction of the invention indicated in Fig. 3 corresponds, in principle, with that of Figs. 1 and 2. The two side plates 40 forming the shackle are provided at both ends with cylindrical drilled holes for the reception of the cross bolts 46. At the center of these bolts 46 is a hollow cylindrical recess, whose axis is directed substantially parallel to the longitudinal axis of the vehicle. On top of the leaf spring 29 rests a block 47, which forms a solid cylindrical thickening of the same diameter as the recesses of the bolts 46. Again, the top of the end of the leaf spring 29 has the fork-like device 30 (not drawn), which prevents a shifting of the blocks 47, in the lengthwise direction of the vehicle. On both ends of the block 47 are semi-circular flanges (shown with dotted lines in Fig. 3), which encircle both sides of bolt 46. In consequence, bolt 46 is also protected against lengthwise shifting. Transverse shifting is again prevented by the side plates 40. The support 44 fastened to the frame of the vehicle has a solid cylindrical thickening 48 at its lower end, which rests in the recess of the lower bolt 46. Support 44 also has two flanges which encircle, fork-like, (similarly as shown in Fig. 1) the bolts 46 in the longitudinal direction of the vehicle and prevent lengthwise shifting.

The modification according to Fig. 4 shows how in all the cases described there may be provided a friction coating or lining 53 particularly adapted to produce friction at the cylindrical surfaces in question.

All the described modifications of the invention present the particular advantage that the increased damping by means of friction is effected merely by the peculiar formation of the usual individual parts. No extra oscillation damping devices have to be furnished, to be fitted at suitable points, such as dashpots or the like. Such additional devices naturally increase the cost of the vehicle, and this is entirely avoided by the present invention.

Having now fully described the invention, what is claimed and desired to be secured by Letters Patent is:—

1. Suspension for vehicles, particularly rail vehicles, including shackles each having two universal joints, one joint of which is adapted for connection to a supporting spring and the other joint to a support on the vehicle frame, each universal joint having two cylindrical plain or journal bearings, the axis of one plain or journal bearing being directed substantially parallel to the longitudinal axis of the vehicle and the axis of the other journal bearing being directed horizontally and vertically to the longitudinal axis of the vehicle, and the diameter of that cylindrical plain or journal bearing, whose axis is substantially parallel to the longitudinal axis of the vehicle being greater than the diameter of the other cylindrical plain or journal bearing, whose axis is directed horizontally and vertically to the longitudinal axis of the vehicle.

2. Suspension for vehicles according to claim 1, characterized by the shackle having two side plates, bolts rotatably inserted in both ends of the pair of side plates, a semi-cylindrical thickening in the center of each bolt and hollow-cylindrical pans at the end of the supporting spring and the support of the vehicle frame and said thickening and said pan forming that cylindrical plain or journal bearing, whose axis is substantially parallel to the longitudinal axis of the vehicle.

3. Suspension for vehicles according to claim 1, characterized by the shackle having two side plates, bolts rotatably inserted in both ends of the pair of side plates, a semi-cylindrical thickening in the center of each bolt and hollow-cylindrical pans at the end of the supporting spring and the support of the vehicle frame, one of said pans being in the form of a removable element and said thickening and said pan forming that cylindrical plain or journal bearing, whose axis is substantially parallel to the longitudinal axis of the vehicle.

4. Suspension for vehicles according to claim 1, characterized by the shackle having two side plates, bolts rotatably inserted in both ends of the pair of side plates, a hollow-cylindrical recess in the center of each bolt and solid cylindrical thickenings at the end of the supporting spring and the support of the vehicle frame and said recess and said thickening forming that cylindrical plain or journal bearing, whose axis is substantially parallel to the longitudinal axis of the vehicle.

5. Suspension for vehicles according to claim 1, characterized by the shackle having two side plates, bolts rotatably inserted in both ends of the pair of side plates, a hollow-cylindrical recess in the center of each bolt and solid cylindrical thickenings at the end of the supporting spring and the support of the vehicle frame, one of said solid cylindrical thickenings being in the form of a removable element and said recess and said thickening forming that cylindrical plain or journal bearing, whose axis is substantially parallel to the longitudinal axis of the vehicle.

OTTO MYLIUS.